United States Patent
Schwarz et al.

(10) Patent No.: US 10,718,233 B2
(45) Date of Patent: Jul. 21, 2020

(54) INTERCOOLED COOLING AIR WITH LOW TEMPERATURE BEARING COMPARTMENT AIR

(71) Applicant: United Technologies Corporation, Farmington, CT (US)

(72) Inventors: Frederick M. Schwarz, Glastonbury, CT (US); Glenn Levasseur, Colchester, CT (US); Brian D. Merry, Andover, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 100 days.

(21) Appl. No.: 16/012,152

(22) Filed: Jun. 19, 2018

(65) Prior Publication Data

US 2019/0383167 A1    Dec. 19, 2019

(51) Int. Cl.
*F02C 7/18* (2006.01)
*F01D 25/12* (2006.01)
(Continued)

(52) U.S. Cl.
CPC .............. *F01D 25/125* (2013.01); *F02C 7/18* (2013.01); *F04D 29/582* (2013.01); *F02K 3/06* (2013.01);
(Continued)

(58) Field of Classification Search
CPC .. F01D 25/125; F02C 7/18; F02C 7/16; F02C 7/185; F04D 29/582; F04D 29/5826;
(Continued)

(56) References Cited

U.S. PATENT DOCUMENTS 2,692,476 A    10/1954  Schaal et al.
3,878,677 A     4/1975  Colvin
(Continued)

FOREIGN PATENT DOCUMENTS

DE         2852057      6/1979
DE    102012208263 A1  11/2013
(Continued)

OTHER PUBLICATIONS

European Search Report for EP Application No. 19179765.3 dated Nov. 12, 2019.

(Continued)

*Primary Examiner* — David E Sosnowski
*Assistant Examiner* — Theodore C Ribadeneyra
(74) *Attorney, Agent, or Firm* — Carlson, Gaskey & Olds, P.C.

(57) ABSTRACT

A gas turbine engine includes a plurality of rotatable components housed within a main compressor section and a turbine section. A cooling system is connected to tap air from said main compressor section. A first tap is connected to a first heat exchanger. The first heat exchanger is connected to a cooling compressor for raising a pressure of the tapped air downstream of the first heat exchanger. A second heat exchanger is downstream of the cooling compressor, and a connection is downstream of the second heat exchanger for delivering air to a bearing compartment. A connection intermediate the cooling compressor and the second heat exchanger delivers cooling air to at least one of the rotatable components.

20 Claims, 3 Drawing Sheets

(51) Int. Cl.
*F04D 29/58* (2006.01)
*F02K 3/06* (2006.01)

(52) U.S. Cl.
CPC .... *F05D 2220/323* (2013.01); *F05D 2240/50* (2013.01); *F05D 2260/211* (2013.01); *F05D 2260/213* (2013.01)

(58) Field of Classification Search
CPC ........ F04D 29/5866; F04D 29/04; F02K 3/06; F05D 2220/323; F05D 2240/50; F05D 2260/211; F05D 2260/213
See application file for complete search history.

(56) References Cited

U.S. PATENT DOCUMENTS

| | | | |
|---|---|---|---|
| 4,254,618 A | 3/1981 | Lovic | |
| 4,539,945 A | 9/1985 | Bosisio | |
| 4,882,902 A | 11/1989 | Reigel et al. | |
| 5,056,335 A | 10/1991 | Enninger et al. | |
| 5,269,135 A | 12/1993 | Vermejan et al. | |
| 5,305,616 A | 4/1994 | Coffinberry | |
| 5,392,614 A | 2/1995 | Coffinberry | |
| 5,414,992 A | 5/1995 | Glickstein | |
| 5,452,573 A | 9/1995 | Glickstein et al. | |
| 5,498,126 A | 3/1996 | Pighetti et al. | |
| 5,724,806 A | 3/1998 | Horner | |
| 5,758,485 A | 6/1998 | Frutschi | |
| 5,867,979 A | 2/1999 | Newton et al. | |
| 5,918,458 A | 7/1999 | Coffinberry et al. | |
| 6,050,079 A | 4/2000 | Durgin et al. | |
| 6,065,282 A | 5/2000 | Fukue et al. | |
| 6,134,880 A | 10/2000 | Yoshinaka | |
| 6,430,931 B1 | 8/2002 | Horner | |
| 6,487,863 B1 | 12/2002 | Chen et al. | |
| 6,584,778 B1 | 7/2003 | Griffiths et al. | |
| 6,612,114 B1 | 9/2003 | Klingels | |
| 6,892,523 B2 | 5/2005 | Fetescu et al. | |
| 7,237,386 B2 | 7/2007 | Hoffmann et al. | |
| 7,246,484 B2 | 7/2007 | Giffin, III et al. | |
| 7,284,377 B2 | 10/2007 | Joshi et al. | |
| 7,306,424 B2 | 12/2007 | Romanov et al. | |
| 7,334,412 B2 | 2/2008 | Tiemann | |
| 7,347,637 B2 | 3/2008 | Kubo et al. | |
| 7,500,365 B2 | 3/2009 | Suciu et al. | |
| 7,552,591 B2 | 6/2009 | Bart et al. | |
| 7,698,884 B2 | 4/2010 | Maguire et al. | |
| 7,765,788 B2 | 8/2010 | Schwarz | |
| 7,823,389 B2 | 11/2010 | Seltzer et al. | |
| 7,882,691 B2 | 2/2011 | Lemmers, Jr. et al. | |
| 7,886,520 B2 | 2/2011 | Stretton et al. | |
| 8,015,828 B2 | 9/2011 | Moniz et al. | |
| 8,037,686 B2 | 10/2011 | Lasker | |
| 8,087,249 B2 | 1/2012 | Ottaviano et al. | |
| 8,181,443 B2 | 5/2012 | Rago | |
| 8,307,662 B2 | 11/2012 | Turco | |
| 8,350,398 B2 | 1/2013 | Butt | |
| 8,397,487 B2 | 3/2013 | Sennoun et al. | |
| 8,402,742 B2 | 3/2013 | Roberge et al. | |
| 8,434,997 B2 | 5/2013 | Pinero et al. | |
| 8,511,967 B2 | 8/2013 | Suciu et al. | |
| 8,522,529 B2 | 9/2013 | Martinou et al. | |
| 8,572,982 B2 | 11/2013 | Tiemann | |
| 8,602,717 B2 | 12/2013 | Suciu et al. | |
| 8,621,871 B2 | 1/2014 | McCune et al. | |
| 8,727,703 B2 | 5/2014 | Laurello et al. | |
| 8,776,952 B2 | 7/2014 | Schwarz et al. | |
| 8,814,502 B2 | 8/2014 | Eleftheriou | |
| 8,876,465 B2 | 11/2014 | Stretton | |
| 8,961,108 B2 | 2/2015 | Bergman et al. | |
| 9,234,481 B2 | 1/2016 | Suciu et al. | |
| 9,243,563 B2 | 1/2016 | Lo | |
| 9,255,492 B2 | 2/2016 | Bacic | |
| 9,297,391 B2 | 3/2016 | Rued et al. | |
| 9,422,063 B2 | 8/2016 | Diaz | |
| 9,429,072 B2 | 8/2016 | Diaz et al. | |
| 2003/0046938 A1 | 3/2003 | Mortzheim et al. | |
| 2004/0088995 A1 | 5/2004 | Reissig | |
| 2005/0172612 A1 | 8/2005 | Yamanaka et al. | |
| 2007/0022735 A1 | 2/2007 | Henry et al. | |
| 2007/0213917 A1 | 9/2007 | Bruno et al. | |
| 2007/0245738 A1 | 10/2007 | Stretton et al. | |
| 2008/0028763 A1 | 2/2008 | Schwarz et al. | |
| 2008/0230651 A1 | 9/2008 | Porte | |
| 2008/0253881 A1 | 10/2008 | Richards | |
| 2009/0007567 A1 | 1/2009 | Porte et al. | |
| 2009/0090096 A1 | 4/2009 | Sheridan | |
| 2009/0145102 A1 | 6/2009 | Roberge et al. | |
| 2009/0196736 A1 | 8/2009 | Sengar et al. | |
| 2009/0226297 A1 | 9/2009 | Yanagi et al. | |
| 2009/0272120 A1 | 11/2009 | Tiemann | |
| 2010/0043396 A1 | 2/2010 | Coffinberry | |
| 2010/0154434 A1 | 6/2010 | Kubota et al. | |
| 2011/0036066 A1 | 2/2011 | Zhang et al. | |
| 2011/0088405 A1 | 4/2011 | Turco | |
| 2011/0120083 A1 | 5/2011 | Giffin et al. | |
| 2011/0247344 A1 | 10/2011 | Glahn et al. | |
| 2012/0067055 A1 | 3/2012 | Held | |
| 2012/0102915 A1 | 5/2012 | Baltas | |
| 2012/0159961 A1 | 6/2012 | Krautheim et al. | |
| 2012/0180509 A1 | 7/2012 | DeFrancesco | |
| 2013/0036747 A1 | 2/2013 | Fuchs et al. | |
| 2013/0067928 A1 | 3/2013 | Arias Chao et al. | |
| 2013/0098059 A1 | 4/2013 | Suciu et al. | |
| 2013/0145744 A1 | 6/2013 | Lo et al. | |
| 2013/0145774 A1 | 6/2013 | Duong et al. | |
| 2013/0186102 A1 | 7/2013 | Lo | |
| 2013/0199156 A1 | 8/2013 | Ress, Jr. et al. | |
| 2013/0239583 A1 | 9/2013 | Suciu et al. | |
| 2013/0319002 A1 | 12/2013 | Sidelkovskiy et al. | |
| 2014/0020506 A1 | 1/2014 | Duong | |
| 2014/0137417 A1 | 5/2014 | Silberberg et al. | |
| 2014/0196469 A1 | 7/2014 | Finney et al. | |
| 2014/0230444 A1 | 8/2014 | Hao et al. | |
| 2014/0250898 A1 | 9/2014 | Mackin et al. | |
| 2014/0260326 A1 | 9/2014 | Schwarz et al. | |
| 2014/0311157 A1 | 10/2014 | Laurello et al. | |
| 2014/0341704 A1 | 11/2014 | Fletcher | |
| 2014/0352315 A1 | 12/2014 | Diaz | |
| 2015/0114611 A1 | 4/2015 | Morris et al. | |
| 2015/0285147 A1 | 10/2015 | Phillips et al. | |
| 2015/0308339 A1 | 10/2015 | Forcier | |
| 2015/0330236 A1 | 11/2015 | Beecroft et al. | |
| 2015/0354465 A1 | 12/2015 | Suciu et al. | |
| 2015/0354822 A1 | 12/2015 | Suciu et al. | |
| 2016/0010554 A1 | 1/2016 | Suciu et al. | |
| 2016/0131036 A1 | 5/2016 | Bintz et al. | |
| 2016/0131037 A1 | 5/2016 | Spangler et al. | |
| 2016/0169118 A1 | 6/2016 | Duong | |
| 2016/0215732 A1 | 7/2016 | Malecki | |
| 2016/0237906 A1 | 8/2016 | Suciu et al. | |
| 2016/0312711 A1 | 10/2016 | Suciu et al. | |
| 2016/0312797 A1 | 10/2016 | Suciu et al. | |
| 2016/0341125 A1 | 11/2016 | Kraft et al. | |
| 2016/0369697 A1 | 12/2016 | Schwarz et al. | |
| 2017/0009657 A1 | 1/2017 | Schwarz et al. | |
| 2017/0044980 A1 | 2/2017 | Duesler et al. | |
| 2017/0044982 A1 | 2/2017 | Duesler et al. | |
| 2017/0152765 A1 | 6/2017 | Uechi et al. | |
| 2017/0159568 A1 | 6/2017 | Sennoun et al. | |
| 2017/0167388 A1 | 6/2017 | Merry et al. | |
| 2017/0175632 A1 | 6/2017 | Hanrahan et al. | |
| 2017/0184027 A1 | 6/2017 | Moniz et al. | |
| 2017/0204787 A1 | 7/2017 | Duesler et al. | |
| 2017/0284305 A1 | 10/2017 | Suciu et al. | |

FOREIGN PATENT DOCUMENTS

| | | |
|---|---|---|
| EP | 0447886 | 9/1991 |
| EP | 0469825 | 2/1992 |
| EP | 0608142 | 7/1994 |
| EP | 0903484 | 3/1999 |
| EP | 1314872 | 5/2003 |
| EP | 1944475 | 7/2008 |

(56) References Cited

FOREIGN PATENT DOCUMENTS

| | | |
|---|---|---|
| EP | 2085599 | 8/2009 |
| EP | 2128023 | 12/2009 |
| EP | 2362081 | 8/2011 |
| EP | 2540991 | 1/2013 |
| EP | 2565392 A2 | 3/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3109438 A1 | 12/2016 |
| EP | 3121411 | 1/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 completed Jun. 30, 2016.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for European Application No. 16202876.5 dated Apr. 24, 2017.
European Search Report for European Application No. 16180657.5 dated Dec. 16, 2016.
European Search Report for EP Application No. 17160816.9 dated Jul. 21, 2017.

INTERCOOLED COOLING AIR WITH LOW TEMPERATURE BEARING COMPARTMENT AIR

BACKGROUND

This application relates to an intercooled cooling air for supplying cooling air for rotating components of a gas turbine engine and for also supplying cooling air to a bearing compartment.

Gas turbine engines are known and typically include a fan delivering air into a bypass duct as propulsion air, and further delivering air into a compressor. Air in the compressor is compressed and passed into a combustion section where it is mixed with fuel and ignited. Products of the combustion pass downstream over turbine rotors driving them to rotate. The turbine rotors, in turn, rotate the compressor and fan.

As known, rotating components in the gas turbine engine have temperature challenges. Thus, it is known to provide cooling air to those components. It has been proposed to utilize compressed air as the cooling air and to deliver it to rotating components in the gas turbine engine.

SUMMARY

A gas turbine engine includes a plurality of rotatable components housed within a main compressor section and a turbine section. A cooling system is connected to tap air from said main compressor section. A first tap is connected to a first heat exchanger. The first heat exchanger is connected to a cooling compressor for raising a pressure of the tapped air downstream of the first heat exchanger. A second heat exchanger is downstream of the cooling compressor, and a connection is downstream of the second heat exchanger for delivering air to a bearing compartment. A connection intermediate the cooling compressor and the second heat exchanger delivers cooling air to at least one of the rotatable components.

In another embodiment according to the previous embodiment, the first tap taps air from the main compressor section at a location upstream of a downstream most location in the main compressor section.

In another embodiment according to any of the previous embodiments, the first and the second heat exchangers are positioned within a bypass duct in said gas turbine engine.

In another embodiment according to any of the previous embodiments, the bearing compartment is radially inward of a combustor intermediate the main compressor section and the turbine section.

In another embodiment according to any of the previous embodiments, the at least one rotatable component includes at least one rotor in the main compressor section.

In another embodiment according to any of the previous embodiments, the at least one rotatable component also includes at least one rotor in the turbine section.

In another embodiment according to any of the previous embodiments, the at least one rotatable component includes at least one rotor in the turbine section.

In another embodiment according to any of the previous embodiments, a control is operable to stop operation of the cooling compressor.

In another embodiment according to any of the previous embodiments, the control operates the cooling compressor at high power operation including take-off of the gas turbine engine and the cooling compressor operates at a discharge total pressure that is higher than a pressure at a downstream most location of the main compressor.

In another embodiment according to any of the previous embodiments, the control stops operation of the cooling compressor at lower power operation including cruise.

In another embodiment according to any of the previous embodiments, a second tap taps compressed air from a location in the main compressor section downstream of a location of the first tap, and is connected to supply air through a check valve to a passage leading downstream of the cooling compressor to the at least one rotatable component, at least when the cooling compression is stopped.

In another embodiment according to any of the previous embodiments, air supplied to the bearing compartment is at a temperature lower than 800° F. at a take-off condition engine.

In another embodiment according to any of the previous embodiments, the bearing compartment is radially in a combustor section which is intermediate the main compressor section and the turbine section. The bearing compartment includes a bearing supporting a high pressure shaft connecting a high pressure compressor rotor to a high pressure turbine rotor, with said high pressure compressor rotor and the high pressure turbine rotor including the at least one of said rotatable components.

In another embodiment according to any of the previous embodiments, air downstream of the second heat exchanger passes into a junction, and a portion of air downstream of the second heat exchanger is connected to the bearing compartment, and a second portion of air downstream of the second heat exchanger is connected to a second use.

In another embodiment according to any of the previous embodiments, the second use includes at least one of a second bearing component, and a downstream location within the turbine section.

In another embodiment according to any of the previous embodiments, air downstream of the second heat exchanger passes into a junction, and a portion of air downstream of the second heat exchanger is connected to the bearing compartment, and a second portion of air downstream of the second heat exchanger is connected to a second use.

In another embodiment according to any of the previous embodiments, the second use includes at least one of a second bearing component, and a downstream location within the turbine section.

In another featured embodiment, a gas turbine engine includes a plurality of rotatable components housed within a main compressor section and a turbine section. A cooling system is connected to tap air from the main compressor section. A tap is connected to a first heat exchanger. There is a means for raising a pressure of the tapped air downstream of the first heat exchanger. A second heat exchanger is downstream of the cooling compressor. A connection is downstream of the second heat exchanger and there is a means for delivering air to a bearing compartment. A connection intermediate the cooling compressor and the second heat exchanger delivers cooling air to at least one of the rotatable components.

In another embodiment according to the previous embodiment, the means for raising a pressure includes a cooling compressor and a pressure of the cooling compressor is higher than a pressure at a downstream most location of the main compressor section.

In another embodiment according to any of the previous embodiments, a control selectively stops operation of the means for raising a pressure.

These and other features may be best understood from the following drawings and specification.

DETAILED DESCRIPTION

Figure 1:
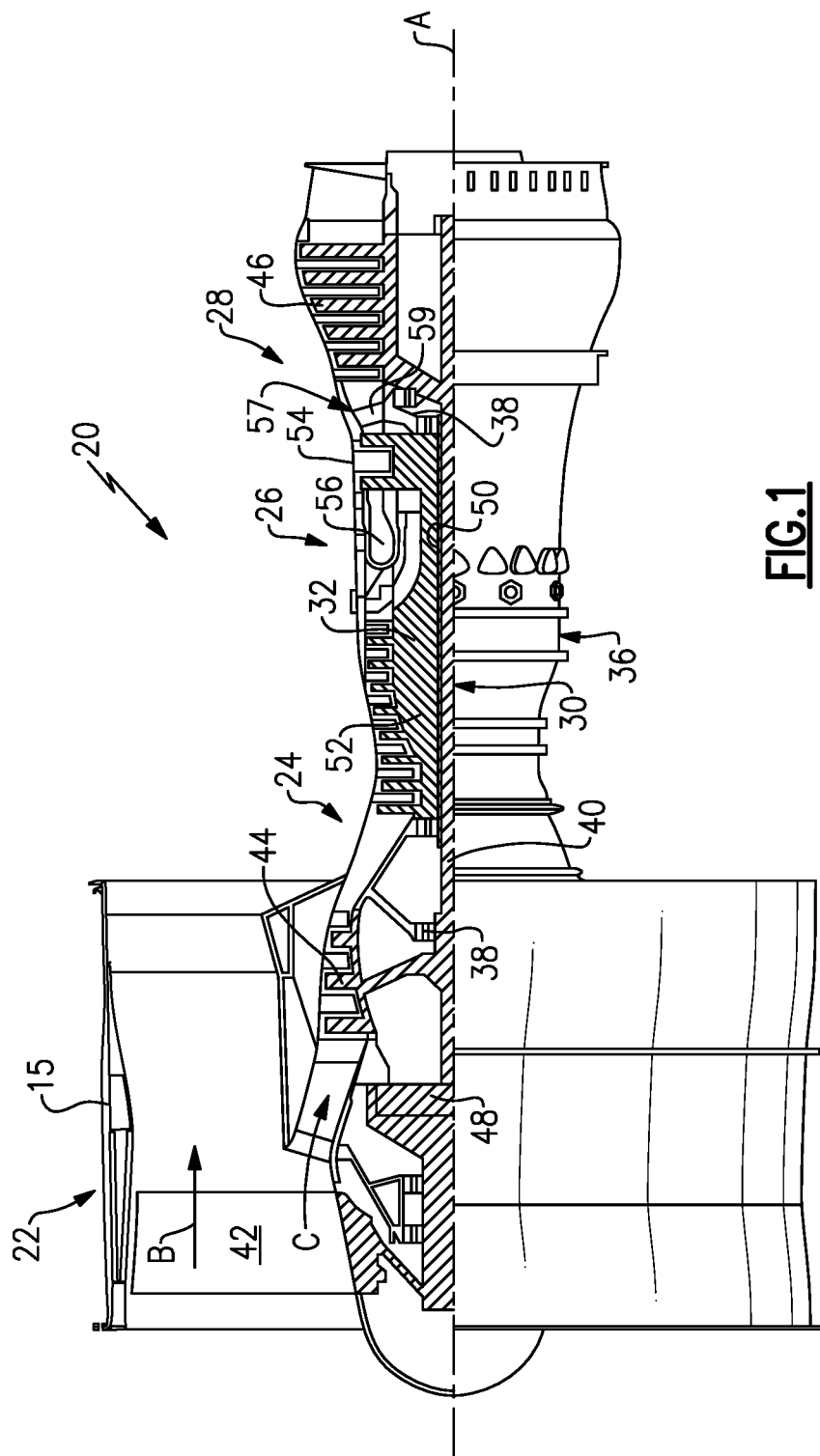
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second (350.5 meters/second).

Figure 2:
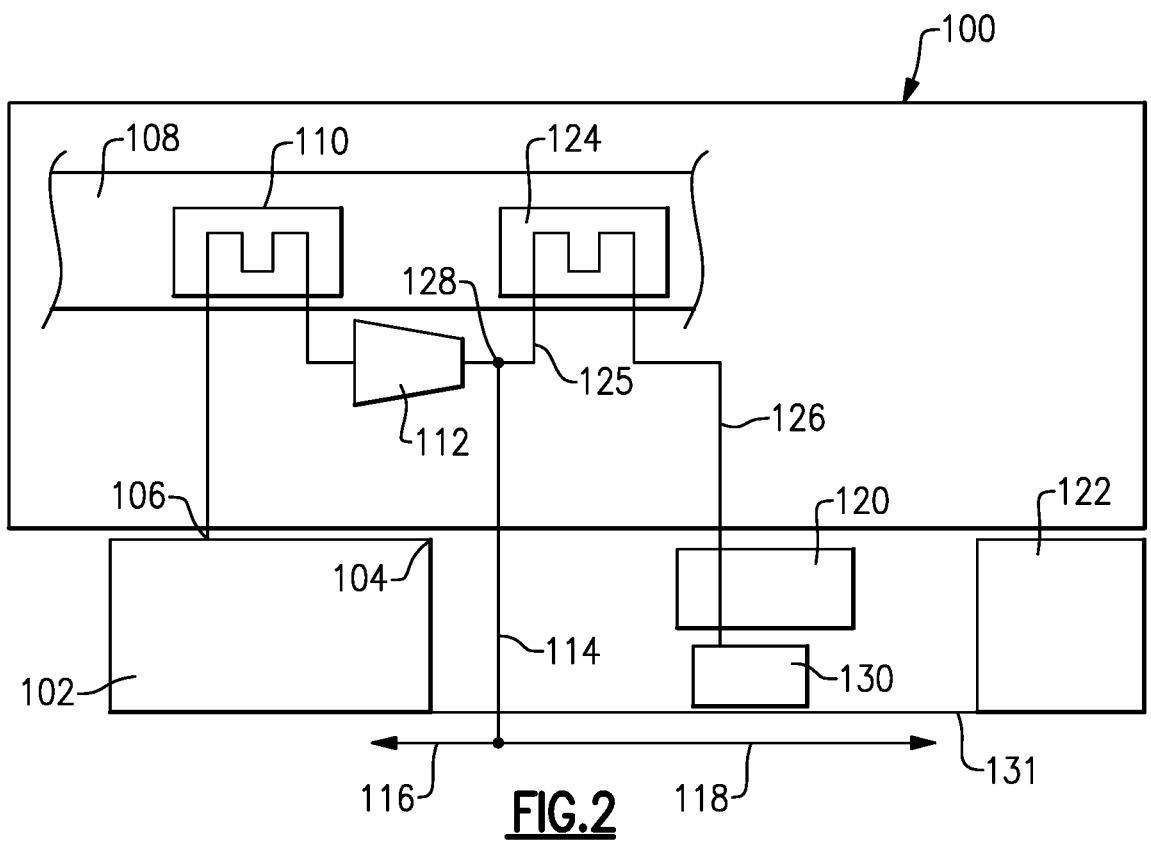
FIG. 2 shows a first schematic system.

FIG. 2 shows a first schematic system 100 for providing cooling air to various components in a gas turbine engine. As shown, a compressor section 102 has a most downstream location 104. This location is where the air is the most highly compressed in the compressor section 102. A tap location 106 is tapped from a point in the main compressor section which is upstream from the downstream most location 104.

The bypass duct 108, which may be similar to the bypass duct in FIG. 1, is shown receiving a heat exchanger 110. The heat exchanger 110 can be placed in other locations within an engine and the bypass duct is simply an example. Air in the bypass duct will cool the tapped air from tap 106 as it passes through the heat exchanger 110.

The heat exchanger 110 is connected to a cooling compressor 112 which may be driven by a motor, or other drive, to compress the air from the tap 106. Air downstream of the cooling compressor 112 passes to a junction 128. Air downstream of a junction 128 may pass through a passage 114 where it may pass into both, or either, directions 116 and 118. Cooling air passing in a direction 116 may cool the disk or other portions of a rotating components in the compressor and, in particular, the most downstream compressor rotor disk and hub. Air passing in the direction 118 may cool rotating components in a turbine section 122 and, in particular, the most upstream or first turbine blade row and first turbine vane row. As illustrated, a combustor 120 is intermediate the compressor 102 and the turbine 122.

Air also passes into connection 125 from junction 128 and through a second heat exchanger 124. Air at passage 126 is downstream of the heat exchanger 124. This air has been cooled to temperatures far below that found at the junction 128. The air being utilized as cooling air in directions 116 and 118 is important, however, the temperature challenges that it will face in cooling the rotating components is not extreme as the temperature challenges faced by the cooling air in passage 126. Air in passage 126 passes to cool a bearing compartment 130. Bearing compartment 130 is shown supporting a shaft portion 131, which may be a portion of the high pressure spool of an engine such as shown in FIG. 1.

As shown, the bearing compartment 130 is radially inward of the combustor 120. It is desirable that the cooling air in passage 126 is able to maintain the bearing compartment 130 at temperatures below say 800° F., and even say 400° F. (at sea level take off) and even lower. As can be appreciated, putting a bearing compartment 130 radially inward of the combustor section 120 places severe cooling challenges on the bearing compartment 130.

However, the location is particularly advantageous for supporting the high pressure spool shaft portion 131. As an example, the location allows a reduction in the high pressure spool clearance from engine bending due to thrust loads imparted onto engine casings and reduces the chance of local rubout of the high compressor due to the bowed rotor deflection that occurs during starting, and, in general, improves high pressure spool clearances in general from maneuver loads. It should be understood the cooling air from passage 126 also provides buffering to send the bearing compartment 130.

Figure 3:
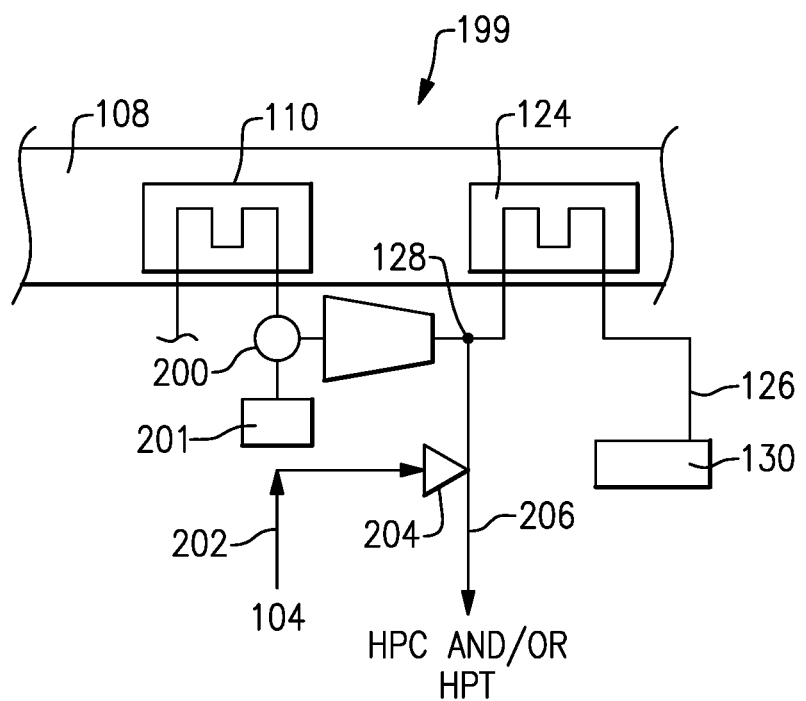
FIG. 3 shows a second embodiment schematic system.

FIG. 3 shows an alternative embodiment 199, wherein a number of the components are similar to embodiment 100. Line 206 generally replaces the line 114 and supplies air to the directions 116 and 118. However, a clutch 200 is shown which allows selective stopping of the cooling compressor 112, such as through a control 201. While a clutch 200 is shown, it should be understood that the control 201 may simply stop operation of the cooling compressor 112. In this embodiment, the cooling compressor 112 can be designed to pressurize the air from tap 106 such that it is even higher than the pressure found at the downstream most location 104.

In this embodiment, a second tap 202 is shown at location 104, and communicating to the line 206 through a check valve 204. It should be understood that the tap 202 can be at any location downstream of the tap 106, and could even be downstream of the point 104. As an example, a location radially outwardly of the combustor 120 would typically be at a pressure generally equivalent to that downstream of the downstream most location 104.

Cooling compressor 112 pressurizes air to a pressure above that found at point 104 while operational. Thus, while the cooling compressor 112 is operating, the check valve 204 will be maintained closed. However, when the control 201 stops compression of air at the cooling compressor 112, the air from the tap 202 will pass through the check valve 204 to line 206, and this air will be supplied to the locations 116 and 118. Air will also be supplied as shown in the first embodiment to the bearing compartment 130.

Figure 4:
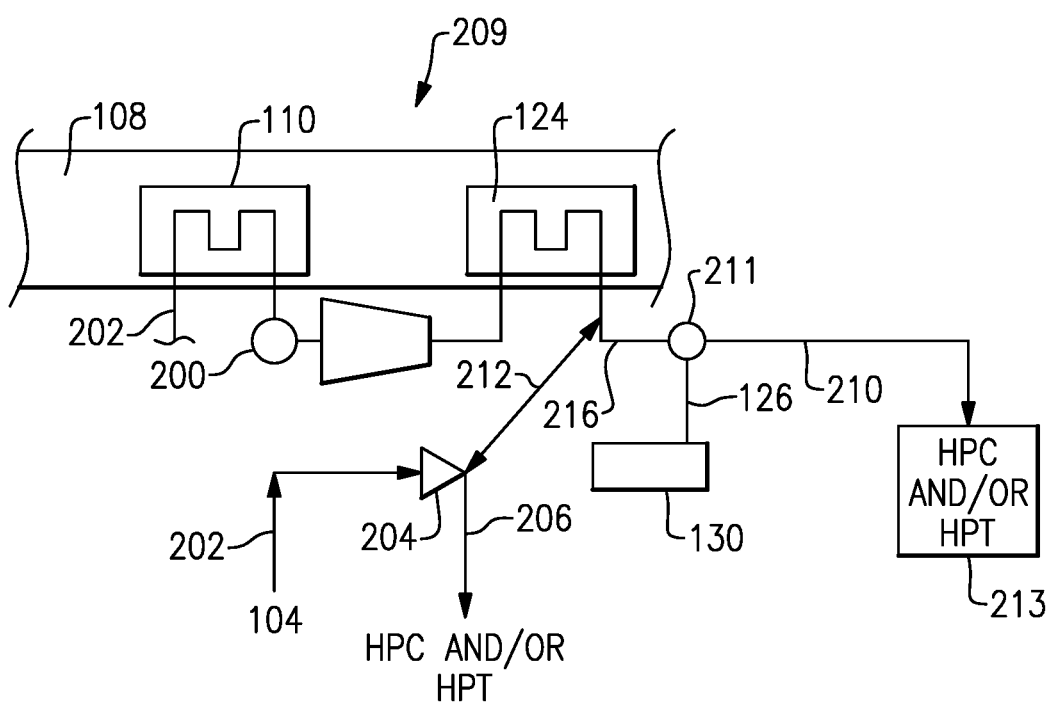
FIG. 4 shows a third embodiment schematic system.

FIG. 4 shows another embodiment 209. Embodiment 209 generally includes the features shown in FIG. 3 and operates much like FIG. 3. However, there is also a tap 210 downstream of a junction 211, such that air approaching the passage 126 also passes into the line 210 to be delivered to a component 213. The air at tap 210 may cool a number of components 213, such as downstream turbine rotors, other bearing compartments, or any number of other applications. Here, a connector 212 alternatively connects passage 206 to a line 216 leading to the junction 211, or to the passage 206, or both. When the compressor 112 is operational, air will flow downstream of the heat exchanger 124 through the passage 212, into the line 206, as well as toward the junction 211. However, when the cooling compressor 112 is stopped, the air may flow from the tap 202 both to the passage 206, but also through the passage 216 to the junction 211 for the cooling purposes as described above.

The use of the control 201 to stop operation of the cooling compressor 112 increases the efficiency of the engine. As an example, at high power operation, the cooling compressor 112 may be utilized such that the air supply to the rotating components is at a very high pressure. On the other hand, at lower power operation, such as ground idle or cruise the cooling compressor may be stopped to increase the energy efficiency of the engine.

A gas turbine engine under this disclosure could be said to include a plurality of rotatable components housed within a main compressor section and a turbine section. A cooling system is connected to tap air from the main compressor section. A tap is connected to a first heat exchanger. There is a means for raising a pressure of the tapped air downstream of the first heat exchanger. A second heat exchanger is downstream of the cooling compressor. There is a connection downstream of the second heat exchanger. There is also means for delivering air to a bearing compartment. A connection intermediate the cooling compressor and the second heat exchanger delivers cooling air to at least one of the rotatable components.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
   a plurality of rotatable components housed within a main compressor section and a turbine section;
   a cooling system connected to tap air from said main compressor section, a first tap connected to a first heat exchanger, said first heat exchanger connected to a cooling compressor for raising a pressure of the tapped air downstream of the first heat exchanger; and
   a second heat exchanger downstream of said cooling compressor, and a connection downstream of said second heat exchanger for delivering air to a bearing compartment, and a connection intermediate said cooling compressor and said second heat exchanger for delivering cooling air to at least one of said rotatable components.

2. The gas turbine engine as set forth in claim 1, wherein said first tap taps air from said main compressor section at a location upstream of a downstream most location in said main compressor section.

3. The gas turbine engine as set forth in claim 1, wherein said first and said second heat exchangers are positioned within a bypass duct in said gas turbine engine.

4. The gas turbine engine as set forth in claim 1, wherein said bearing compartment is radially inward of a combustor intermediate said main compressor section and said turbine section.

5. The gas turbine engine as set forth in claim 1, wherein said at least one rotatable component includes at least one rotor in said main compressor section.

6. The gas turbine engine as set forth in claim 5, wherein said at least one rotatable component also includes at least one rotor in said turbine section.

7. The gas turbine engine as set forth in claim 1, wherein said at least one rotatable component includes at least one rotor in said turbine section.

8. The gas turbine engine as set forth in claim 1, wherein a control is operable to stop operation of said cooling compressor.

9. The gas turbine engine as set forth in claim 8, wherein said control operates said cooling compressor at high power operation including take-off of said gas turbine engine and the cooling compressor operates at a discharge total pressure that is higher than a pressure at a downstream most location of the main compressor.

10. The gas turbine engine as set forth in claim 9, wherein said control stops operation of said cooling compressor at lower power operation including cruise.

11. The gas turbine engine as set forth in claim 8, wherein a second tap taps compressed air from a location in said main compressor section downstream of a location of said first tap, and is connected to supply air through a check valve to a passage leading downstream of said cooling compressor to said at least one rotatable component, at least when said cooling compression is stopped.

12. The gas turbine engine as set forth in claim 1, wherein air supplied to said bearing compartment is at a temperature lower than 800° F. at a take-off condition engine.

13. The gas turbine engine as set forth in claim 1, wherein said bearing compartment is radially in a combustor section which is intermediate said main compressor section and said turbine section, and said bearing compartment includes a bearing supporting a high pressure shaft connecting a high pressure compressor rotor to a high pressure turbine rotor, with said high pressure compressor rotor and said high pressure turbine rotor including said at least one of said rotatable components.

14. The gas turbine engine as set forth in claim 13, wherein air downstream of said second heat exchanger passes into a junction, and a portion of air downstream of said second heat exchanger is connected to said bearing compartment, and a second portion of air downstream of said second heat exchanger is connected to a second use.

15. The gas turbine engine as set forth in claim 14, wherein said second use includes at least one of a second bearing component, and a downstream location within said turbine section.

16. The gas turbine engine as set forth in claim 1, wherein air downstream of said second heat exchanger passes into a junction, and a portion of air downstream of said second heat exchanger is connected to said bearing compartment, and a second portion of air downstream of said second heat exchanger is connected to a second use.

17. The gas turbine engine as set forth in claim 16, wherein said second use includes at least one of a second bearing component, and a downstream location within said turbine section.

18. A gas turbine engine comprising:
a plurality of rotatable components housed within a main compressor section and a turbine section;
a cooling system connected to tap air from said main compressor section, a tap connected to a first heat exchanger, means for raising a pressure of the tapped air downstream of the first heat exchanger; and
a second heat exchanger downstream of said cooling compressor, and a connection downstream of said second heat exchanger and means for delivering air to a bearing compartment, and a connection intermediate said cooling compressor and said second heat exchanger for delivering cooling air to at least one of said rotatable components.

19. The gas turbine engine as set forth in claim 18, wherein said means for raising a pressure includes a cooling compressor and a pressure of said cooling compressor is higher than a pressure at a downstream most location of the main compressor section.

20. The gas turbine engine as set forth in claim 18, wherein a control selectively stops operation of said means for raising a pressure.

* * * * *